(12) United States Patent
Saito et al.

(10) Patent No.: US 7,079,200 B2
(45) Date of Patent: Jul. 18, 2006

(54) LIQUID CRYSTAL DISPLAY DEVICE

(75) Inventors: Ken Saito, Mobara (JP); Shigeo Shimano, Chosei (JP); Masayuki Mifune, Mobara (JP)

(73) Assignees: Hitachi Displays, Ltd., Mobara (JP); Hitachi Display Devices, Ltd., Mobara (JP)

( * ) Notice: Subject to any disclaimer, the term of this patent is extended or adjusted under 35 U.S.C. 154(b) by 99 days.

(21) Appl. No.: 10/937,328

(22) Filed: Sep. 10, 2004

(65) Prior Publication Data
US 2005/0052588 A1    Mar. 10, 2005

(30) Foreign Application Priority Data
Sep. 10, 2003    (JP) .............................. 2003-318557

(51) Int. Cl.
*G02F 1/13*    (2006.01)
(52) U.S. Cl. ...................................................... 349/58
(58) Field of Classification Search .................. 349/58; 455/566, 90.3
See application file for complete search history.

(56) References Cited

U.S. PATENT DOCUMENTS

| | | | |
|---|---|---|---|
| 6,741,301 B1 * | 5/2004 | Tsuji | 349/58 |
| 6,961,105 B1 * | 11/2005 | Chang et al. | 349/114 |
| 2001/0011029 A1 * | 8/2001 | Iwabuchi et al. | 455/566 |

* cited by examiner

*Primary Examiner*—James A. Dudek
(74) *Attorney, Agent, or Firm*—Antonelli, Terry, Stout and Kraus, LLP.

(57) ABSTRACT

A liquid crystal display device formed as a both-side liquid crystal display device can suppress the generation of brightness irregularities generated on a main liquid crystal display panel thereof and can display an image with a uniform brightness over the whole screen to an extent that a uniform brightness is obtained in practical use. On a bottom surface of a first recessed portion formed in a casing, an optical sheet is arranged such that the optical sheet bridges over an opening, and a proper amount of color pigment is added to the casing on which the optical sheet is arranged in a contact state, thus making the reflectance wavelength characteristic of the surface substantially equal to the reflectance wavelength characteristic of a portion of the sub liquid crystal display panel.

15 Claims, 4 Drawing Sheets

LIQUID CRYSTAL DISPLAY DEVICE

BACKGROUND OF THE INVENTION

The present invention relates to a liquid crystal display device (both-side liquid crystal display device) of the type which is typically mounted on a foldable type mobile phone or the like and is provided with a main liquid crystal display panel and a sub liquid crystal display panel having the screen smaller than a screen of the main liquid crystal display panel; and, more particularly, the invention relates to a liquid crystal display device of this type in which the generation of brightness irregularities on the screen of the main liquid crystal display panel can be suppressed.

Along with the down-sizing of a mobile phone or a personal digital assistant, which is provided with a liquid crystal display panel, a mobile phone or a personal digital assistant which is designed such that a key pad portion and a liquid crystal display panel are folded so as to be overlapped relative to each other at the time of non-calling (at the standby time) has been commercialized. Further, in recent years, a miniaturized panel, which can display information even in a state in which the mobile phone or the personal digital assistant is folded (non-calling state), and is arranged on a back surface side of the above-mentioned liquid crystal display panel, has been commercialized.

As a liquid crystal display device (a liquid crystal display module), which includes a second liquid crystal display panel (also referred to as a sub liquid crystal display panel or a sub panel) in addition to a conventional liquid crystal display panel (also referred to as a main liquid crystal display panel, a main panel), and which is preferably used as a mobile phone or a personal digital assistant, there has been developed a product referred to as a both-side liquid crystal display device, which has two liquid crystal display panels disposed on opposite sides of one lighting system (also referred to as a backlight system), whereby the lighting device radiates light to the respective liquid crystal display panels. Such a both-side liquid crystal display device and a mobile phone on which the both-side liquid crystal display device is mounted are described in Japanese Patent Publication 2002-287144 (patent literature 1), for example.

On the other hand, a lighting device (a both-surface light-emitting flat type light source device) which radiates light respectively from both surfaces has been proposed (Japanese Patent 3326854 (patent literature 2)). Further, one example of a light guide plate (also referred to as a light guide body, a light guide), which is suitably adopted for designing an optical system of a flat light source device, is disclosed in Japanese Patent Publication 2000-310777 (patent literature 3).

SUMMARY OF THE INVENTION

With respect to the both-side liquid crystal display device described in the above-mentioned patent literature 1, the main liquid crystal display panel and the sub liquid crystal display panel, which differ from each other with respect to the size of the display screen, use one planar light source in common. On the other hand, in view of the fact that the mobile telephone or the personal digital assistant is required to satisfy a demand for down-sizing and a reduction of the power consumption, as the both-side liquid crystal display device mounted on such a device, the planar light source (lighting device), which is described in the above-mentioned patent literature 2 and is formed by combining a light emitting diode (a semiconductor light emitting element) and a light guide plate, is used in general.

In such a lighting device (both-surface light emitting type device), a main liquid crystal display panel is mounted on one of the main surfaces of the light guide plate disclosed in the above-mentioned patent literature 2, and a sub liquid crystal display panel is mounted on another main surface of the light guide plate, such that the main liquid crystal display panel and the sub liquid crystal display panel face each other in an opposed manner, and a light source (the above-mentioned light emitting diode) is arranged to face one of the side surfaces of the light guide plate in an opposed manner. In this lighting device, light incident on the light guide plate from the light source is radiated to the respective main surfaces so as to produce image displays on the main liquid crystal display panel and the sub liquid crystal display panel, respectively.

The light which is incident on the light guide plate from one of the side surfaces of the light guide plate propagates in the inside of the light guide plate along the main surfaces thereof. Further, the light which is reflected on one main surface is radiated from another main surface, and the light which is reflected on the other main surface is radiated from the one main surface, and these lights are respectively incident on the sub liquid crystal display panel and the main liquid crystal display panel. To uniformly correct the radiation strengths of the lights which decrease in strength corresponding to the distances from the light source (side surface of the light guide plate which faces the light emitting diode), a pattern of grooves or projections disclosed in the above-mentioned patent literature 3 is formed on at least one of the main surfaces of the light guide plate, wherein the size and the distance of the grooves or the projections is changed corresponding to the distance from the light source.

However, compared to the area of one main surface of the light guide plate which faces the main liquid crystal display panel in an opposed manner, the area of the other main surface of the light guide plate which faces the sub liquid crystal display panel is small, and the one main surface of the light guide plate faces the other main surface of the light guide plate. Accordingly, the strength of light, which is radiated from the one main surface of the light guide plate is lowered at one portion of the one main surface of the light guide plate which faces a region of another main surface of the light guide plate which faces the sub liquid crystal display panel, is lowered compared to the strength of light in a peripheral portion which surrounds the one portion. As a result, in an image displayed on the main liquid crystal display panel, so-called brightness irregularities, which in a phenomenon in which another main screen of the light guide plate becomes dark depending on the region which faces the sub liquid crystal display panel, are generated.

Accordingly, the invention has been made to overcome the above-mentioned drawback of the related art, and it is an object of the invention to provide a liquid crystal display device, of the type which is referred to as a both-side liquid crystal display device, which can suppress the generation of the above-mentioned brightness irregularities that are generated on the main liquid crystal display panel and which can display an image with the uniform brightness over the whole region of a screen.

According to one aspect of the invention, there is provided a liquid crystal display device which includes a light source, a light guide body which guides light from the light source, a main liquid crystal display panel which is arranged on one surface side of the light guide body, and a sub liquid crystal display panel which is arranged on another surface side of the light guide body and has a shape smaller than the shape of the main liquid crystal display panel. The liquid crystal display device includes a holding portion which has a first side which holds the main liquid crystal display panel and the light guide body and a second side which holds the sub liquid crystal display panel. The holding portion has an opening portion between the light guide plate arranged on the first side and the sub liquid crystal display panel arranged on the second side, and the reflectance wavelength characteristic of a bottom surface of the first side of the holding portion is substantially equal to the reflectance wavelength characteristic of the sub liquid crystal display panel. Due to such a constitution, the brightness is made uniform over the whole region of the screen of the main liquid crystal display panel, and, hence, it is possible to overcome the above-mentioned drawbacks of the related art.

Here, in accordance with the invention, the expression substantially equal reflectance wavelength characteristic implies that the reflectance wavelength characteristic of the sub liquid crystal display panel falls within a range of ±5% of the reflectance wavelength characteristic of the bottom surface of the first side of the holding portion.

According to another aspect of the invention, there is provided a liquid crystal display device which includes a light source, a light guide body which guides light from the light source, a main liquid crystal display panel which is arranged on one surface side of the light guide body, and a sub liquid crystal display panel which is arranged on another surface side of the light guide body and has a shape smaller than the shape of the main liquid crystal display panel. The liquid crystal display device includes a holding portion which has a first side which holds the main liquid crystal display panel and the light guide body and a second side which holds the sub liquid crystal display panel. The holding portion has an opening portion between the light guide plate arranged on the first side and the sub liquid crystal display panel arranged on the second side. An optical sheet is arranged on the first side of the holding portion corresponding to a position where the sub liquid crystal display panel is arranged, and the reflectance wavelength characteristic of a bottom surface of the first side of the holding portion is substantially equal to the reflectance wavelength characteristic of the optical sheet which is arranged corresponding to the sub liquid crystal display panel. Due to such a constitution, the brightness is made uniform over the whole region of the screen of the main liquid crystal display panel, and, hence, it is possible to overcome the above-mentioned drawbacks of the related art.

According to still another aspect of the invention, there is provided a liquid crystal display device which includes a casing having a first recessed portion which opens on one side and a second recessed portion which opens on another side opposite to the one side. The second recessed portion has a bottom surface thereof opened toward the first recessed portion side, a main liquid crystal display panel which is housed in the first recessed portion of the casing, and a sub liquid crystal display panel which is housed in the second recessed portion of the casing. The reflectance wavelength characteristic of the bottom surface of the first recessed portion is substantially equal to the reflectance wavelength characteristic of the sub liquid crystal display panel as measured from the first recessed portion side. Also, due to such a constitution, the brightness is made uniform over the whole region of the screen of the main liquid crystal display panel, and, hence, it is possible to overcome the above-mentioned drawbacks of the related art.

According to still another aspect of the invention, there is provided a liquid crystal display device which has one liquid crystal display panel, a light source and a light guide body arranged on one side and another liquid crystal display panel arranged on the opposite side, and which includes a casing having an opening between another liquid crystal display panel and the light guide body on one side. The reflectance wavelength characteristic of a surface at one side is substantially equal to the reflectance wavelength characteristic of another liquid crystal display panel as measured from the one side. Also, due to such a constitution, the brightness is made uniform over the whole region of the screen of one liquid crystal display panel, and, hence, it is possible to overcome the above-mentioned drawbacks of the related art.

In the mentioned several aspects of the invention mentioned above, it is preferable that the surface on which the holding portion or the main liquid crystal display panel of the casing is arranged is formed by plastic resin containing titanium oxide and a gray color pigment, and, hence, it is possible to make the reflectance wavelength characteristic of the holding portion and the reflectance wavelength characteristic of the display screen of the sub liquid crystal display panel substantially equal to each other, whereby it is possible to overcome the above-mentioned drawbacks of the related art.

Here, the invention is not limited to the above-mentioned constitutions, and various modifications are conceivable without departing from the technical concept of the invention.

DETAILED DESCRIPTION OF THE INVENTION

Preferred embodiments of the invention will be explained in detail hereinafter in conjunction with the drawings. With respect to the drawings which are referred to in the explanation made hereinafter, parts having identical functions are indicated by the same symbols and a repeated explanation of the parts will be omitted as much as possible.

Figure 1A:
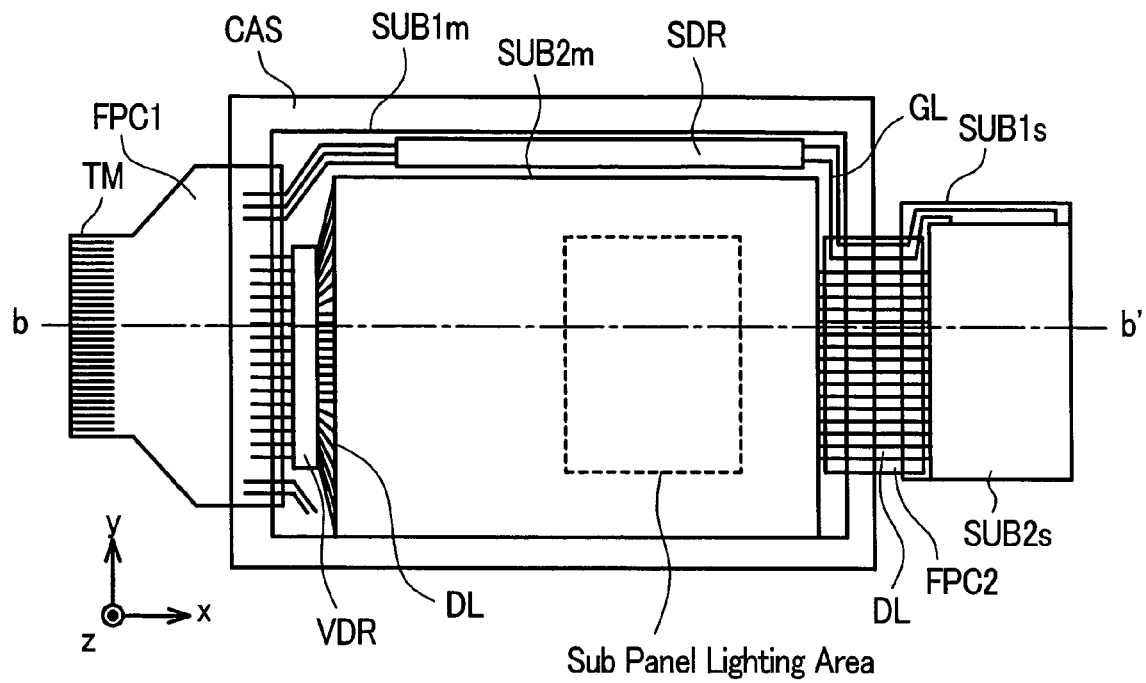
FIG. 1A is a plan view and FIG. 1B is a cross-sectional view taken along line b–b' in FIG. 1A, showing one example of a liquid crystal display device according to the invention.
Figure 1B:
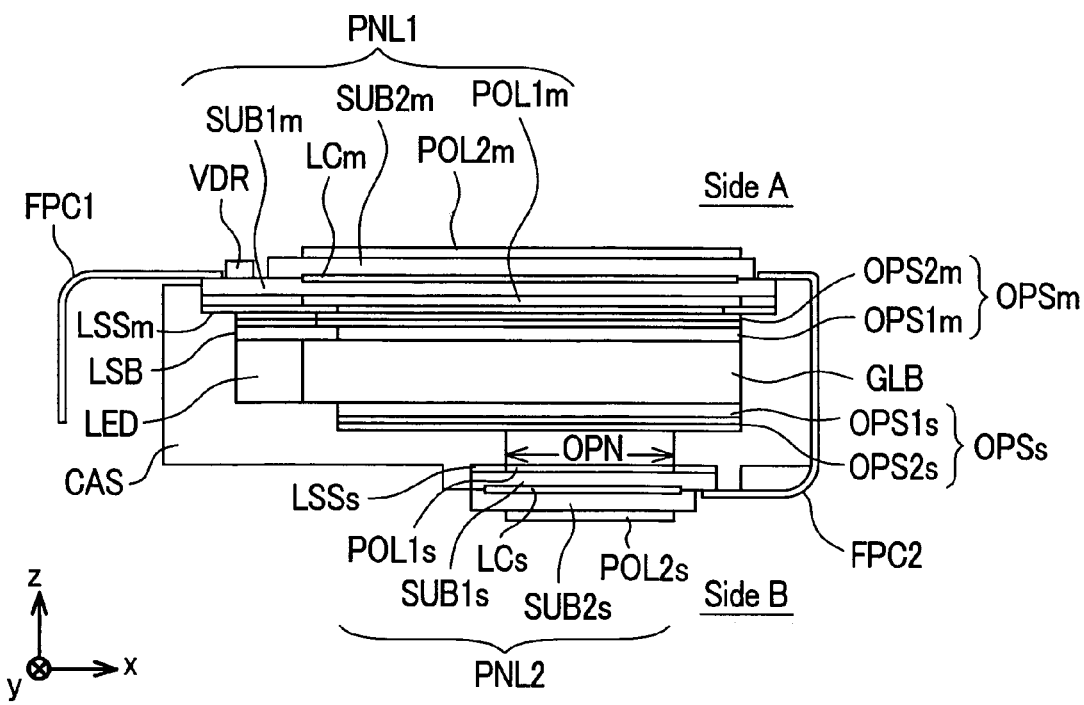

FIG. 1A shows the planar structure of one example of a liquid crystal display device (a both-side liquid crystal display device) according to the invention, which includes a main liquid crystal display panel PNL1 and a sub liquid crystal display panel PNL2 having a screen smaller than the screen of the main liquid crystal display panel PNL1, as viewed from a mounting surface of the main liquid crystal display panel PNL1. FIG. 1B is a cross-sectional view showing the cross-sectional structure of the liquid crystal display device taken along a line b–b' in FIG. 1A.

In the planar structure shown in FIG. 1A, to explain the manner of connection of the main liquid crystal display panel PNL1 and the sub liquid crystal display panel PNL2, the sub liquid crystal display panel PNL2 is shown in a state in which the sub liquid crystal display panel PNL2 is not housed in a casing CAS. However, in a state that the liquid crystal display device is completed, the sub liquid crystal display panel PNL2 is also housed in the inside of the casing CAS, as shown in FIG. 1B.

Here, the coordinate axes, which are respectively shown in FIG. 1A and FIG. 1B, facilitate an understanding of the liquid crystal display device of this embodiment, as well as the shapes and the layout of the constitutional parts mounted on the liquid crystal display device. For example, the x axis represents the direction away from a side surface of a light source (light emitting diode LED) or a side surface which faces the side surface of a light source (left-side end surface shown in FIG. 1B) of the light guide plate GLB, which faces the light source in an opposed manner, while the y axis represents the extension direction of side surfaces of the light guide plate GLB, which faces the light source in an opposed manner.

The main liquid crystal display panel PNL1 is configured such that a pair of substrates (glass substrates or plastic substrates) SUB1m, SUB2m having a light transmitting property are fixed to each other by making respective main surfaces thereof face each other. A liquid crystal layer LCm is formed in a gap defined between these substrates SUB1m, SUB2m so as to form a display screen. Further, polarizers POL1m, POL2m are respectively arranged on the main surfaces which are formed by both outer surfaces of these substrates SUB1m, SUB2m.

The sub liquid crystal display panel PNL2 is also configured, in the same manner as the main liquid crystal display panel PNL1, such that a pair of substrates (glass substrates or plastic substrates) SUB1s, SUB2s having a light transmitting property are fixed to each other by making respective main surfaces thereof face each other. A liquid crystal layer LCs is formed in a gap defined between these substrates SUB1s, SUB2s so as to form a display screen. Further, polarizers POL1s, POL2s are respectively arranged on the main surfaces which form both outer surfaces of these substrates SUB1s, SUB2s. As a casing CAS which holds the main liquid crystal display panel PNL1 and the sub liquid crystal display panel PNL2, for example, a mold casing made of a polycarbonate resin material, which is formed by molding, can be used.

In the casing CAS, a first recessed portion which opens in one side (Side A shown in FIG. 1B (or a first side)) and a second recessed portion which opens in another side (Side B shown in FIG. 1B (or a second side)) opposite to this one side are formed. In this first recessed portion, a light emitting diode LED, a light source substrate LSB on which the light emitting diode LED is mounted, a light guide plate GLB and the like are housed, and the substrates SUB1m of the main liquid crystal display panel PNL1 are fitted into an inlet portion (an uppermost portion of the casing CAS shown in FIG. 1B).

On the other hand, in the second recessed portion (a lower portion of the casing CAS shown in FIG. 1B), the substrates SUB1s of the sub liquid crystal display panel PNL2 is fitted. In the inlet portion of the first recessed portion, a terraced surface which is fitted into a periphery of the main liquid crystal display panel PNL1 (substrates SUB1m) is formed in a frame shape, while the periphery of the main surface of the main liquid crystal display panel PNL1 is fixed to the terraced surface using a light shielding spacer LSSm having tackiness.

Also, in the second recessed portion, a terraced surface which is fitted into a periphery of the sub liquid crystal display panel PNL2 (substrates SUB1s) is formed to have a frame shape, while the periphery of the main surface of the sub liquid crystal display panel PNL2 is fixed to the terraced surface using a light shielding spacer LSSs having tackiness. Further, an opening OPN which reaches a bottom surface of the second recessed portion from a bottom surface of the first recessed portion is formed in the casing CAS, while light which is radiated from a second main surface (a lower surface in FIG. 1B) of the light guide plate GLB through the opening OPN is radiated to the main surface of the sub liquid crystal display panel PNL2 (substrates SUB1s). The area of the opening OPN is smaller than the area of the bottom surface of the first recessed portion and the second recessed portion. Here, a holding portion which is constituted of the bottom surface of the first recessed portion and the bottom surface of the second recessed portion has a structure in which the light guide plate GLB and the sub liquid crystal display panel PNL2 are held.

On the other hand, between the first main surface of the light guide plate GLB and the main surface of the main liquid crystal display panel PNL1 (substrates SUB1m), an optical sheet OPSm, which is constituted of a light diffusion sheet OPS1m, which uniformly diffuses light radiated from the first main surface in the main surface of the substrate SUB1m, and a light focusing sheet OPS2m, which has a function of focusing or converging the advancing direction of light along the normal direction of the main surface of the substrate SUB1m, are inserted. Further, between the second main surface of the light guide plate GLB and the main surface of the sub liquid crystal display panel PNL2 (substrates SUB1s), an optical sheet OPSs, which is constituted of a light diffusion sheet OPS1s, which uniformly diffuses light radiated from the second main surface (a portion facing the opening OPN in an opposed manner) in the main surface of the substrate SUB1s, and a light focusing sheet OPS2s, which has a function of focusing or converging the advancing direction of light along the normal direction of the main surface of the substrate SUB1s, are inserted.

These optical sheets are stacked on the first recessed portion of the casing CAS in the order of the focusing sheet OPS2s (two sheets), the light diffusion sheet OPS1s, the light guide plate GLB, the light diffusion sheet OPS1m and the light focusing sheet OPS2m (two sheets) from a bottom surface thereof. As these light focusing sheets OPS2s, OPS2m, a prism sheet which forms a prism-like projection on one main surface thereof, for example, is used.

Since the light focusing sheet OPS2s and the light diffusion sheet OPS1s have an area equal to or larger than area of the screen of the main liquid crystal display panel PNL1, the light focusing sheet OPS2s and the light diffusion sheet OPS1s are arranged to bridge over the above-mentioned opening OPN at the bottom surface of the first recessed portion. Further, when the casing CAS is made of a material which hardly allows light to pass therethrough, in a region of the light focusing sheet OPS2s which faces the bottom surface of the first recessed portion (not facing the opening OPN), the light radiated from the second main surface of the light guide plate GLB is made to return to the inside of the light guide plate GLB and is radiated to the main surface of the main liquid crystal display panel PNL1 from the first main surface. The optical properties of the light diffusion sheet and the light focusing sheet may be used in common or the main liquid crystal display panel PNL1 and the sub liquid crystal display panel PNL2. Further, either one or both of the light diffusion sheet and the light focusing sheet may be omitted corresponding to the optical characteristic of the light guide plate GLB.

Since both of the main liquid crystal display panel PNL1 and the sub liquid crystal display panel PNL2 of this embodiment, as shown in FIG. 1A, have an active matrix type structure, on respective screens (image display regions), a plurality of video signal lines DL, which extend along the x axis and are arranged in parallel along the y axis, which intersects the x axis, and a plurality of scanning signal lines GL, which extend along the y axis and are arranged in parallel along the x axis, are formed. Here, in FIG. 1A, the illustration of the video signal lines DL and the scanning signal lines GL, which are arranged within the respective screens of the main liquid crystal display panel PNL1 and the sub liquid crystal display panel PNL2, is omitted and only portions arranged outside thereof are shown.

On a peripheral portion of the main surface of the substrate SUB1m, which projects from the substrates SUB2m of the main liquid crystal display panel PNL1, a video signal drive circuit VDR and a scanning signal drive circuit SDR are mounted. The video signal drive circuit VDR outputs video signals to the plurality of video signal lines DL formed on the respective screens of the main liquid crystal display panel PNL1 and the sub liquid crystal display panel PNL2. The scanning signal drive circuit SDR outputs scanning signals to the plurality of scanning signal lines GL formed on the respective screens of the main liquid crystal display panel PNL1 and the sub liquid crystal display panel PNL2. Respective pixels which are formed on the respective screens of the main liquid crystal display panel PNL1 and the sub liquid crystal display panel PNL2 fetch the video signals from one of the plurality of video signal lines DL through active elements formed thereon, and this timing is controlled based on the scanning signals inputted to the active elements from one of the plurality of scanning signal lines GL.

On the screen of the main liquid crystal display panel PNL1 of this embodiment, the video signal lines which transmit a red video signal, a green video signal and a blue video signal are repeatedly arranged in parallel along the y axis sequentially in the order of red, green and blue. In this embodiment, 176 video signal lines are provided for each color. Accordingly, on the screen of the main liquid crystal display panel PNL1, 528 video signal lines in total are arranged in parallel. Further, 240 scanning signal lines, which intersect the video signal lines, are arranged in parallel along the x axis so that a color image is displayed using 42240 pixels in total.

On the other hand, on the screen of the sub liquid crystal display panel PNL2 of this embodiment, the video signal lines which transmit a red video signal, a green video signal and a blue video signal are repeatedly arranged in parallel along the y axis sequentially in the order of red, green and blue. In this embodiment, 120 video signal lines are provided for each color. Accordingly, on the screen of the sub liquid crystal display panel PNL2, 360 video signal lines in total are arranged in parallel. Further, 64 scanning signal lines, which intersect the video signal lines, are arranged in parallel along the x axis so that a color image is displayed using 7680 pixels in total.

Here, the video signal drive circuit VDR outputs the video signal to the 528 video signal lines (176 lines for each color) formed on the screen of main liquid crystal display panel PNL1 and 360 video signal lines (120 lines for each color) formed on the screen of sub liquid crystal display panel PNL2. Since the video signal drive circuit VDR receives video data from an external circuit of the liquid crystal display device through a flexible printed circuit board FPC1, the video signal drive circuit VDR is mounted on a peripheral portion (left end in FIG. 1A) of the main surface of the substrates SUB1m, to which one end of the flexible printed circuit board FPC1 is connected.

On another end of the flexible printed circuit board FPC1, a plurality of terminals TM, which are connected to an external circuit (not shown in FIG. 1) of the liquid crystal display device, are formed. Outputting of the video signal from the video signal drive circuit VDR arranged in this manner to 360 video signal lines, which are formed on the screen of the sub liquid crystal display panel PNL2, is performed by allowing the video signal to pass through 360 (120 for each color) video signal lines out of the video signal lines formed on the screen of the main liquid crystal display panel PNL1 and by extending these 360 video signal lines DL to the flexible printed circuit board FPC2 and the main surface of the substrates SUB1s of the sub liquid crystal display panel PNL2.

On the other hand, the scanning signal drive circuit SDR also sequentially outputs the scanning signal to 240 of scanning signal lines formed on the screen of the main liquid crystal display panel PNL1 and 64 scanning signal lines formed on the screen of the sub liquid crystal display panel PNL2 in response to a clock signal inputted to the scanning signal drive circuit SDR from an external circuit of the liquid crystal display device through the flexible printed circuit board FPC1. Outputting of the scanning signal from the scanning signal drive circuit SDR mounted on the peripheral portion (upper end in FIG. 1A) of the main surface of the substrates SUB1m to 64 scanning signal lines formed on the sub liquid crystal display panel PNL2 is performed by extending the respective 64 scanning signal lines pulled out to the peripheral portion (upper end in FIG. 1A) of the main surface of the substrates SUB1s of the sub liquid crystal display panel PNL2 toward the flexible printed circuit board FPC2 and the main surface of the substrates SUB1m of the main liquid crystal display panel PNL1.

In this manner, the images (information) formed on the screen of the main liquid crystal display panel PNL1 and the screen of the sub liquid crystal display panel PNL2 for every frame period can be observed by a user with his/her naked eyes by propagating the light emitted from the light emitting diode (light emitting element) LED which is arranged to face one side surface of the light guide plate GLB to the inside of the light guide plate GLB and by respectively irradiating the main liquid crystal display panel PNL1 and the sub liquid crystal display panel PNL2 with light from the first main surface (upper surface in FIG. 1B) and the second main surface (lower surface in FIG. 1B).

In the liquid crystal display device (both-side liquid crystal display device) described above, a key pad portion and the above-mentioned main liquid crystal display panel PNL1 are mounted on a foldable mobile phone in a folded state such that they face each other. Accordingly, when the foldable mobile phone is in a folded state (for example, during a standby time), only the image of the sub liquid crystal display panel PNL2 can be received by a user of the foldable mobile phone. In a state in which the foldable mobile phone is opened (for example, in a calling state), the respective images of the main liquid crystal display panel PNL1 and the sub liquid crystal display panel PNL2 can be viewed by the user of the foldable mobile phone.

In a so-called edge-light type liquid crystal display device having a lighting device which is constituted of a light guide plate and a light source which is arranged on a side surface thereof, to one of the main surfaces of the light guide plate, the reflection structure which returns light radiated from one main surface of the light guide plate into the inside of the light guide plate is provided, and the radiation of light is generated from one main surface of the light guide plate. Accordingly, even when such a reflection structure is not formed on the second main surface of the light guide plate GLB which is mounted on the liquid crystal display device of this embodiment, light having a sufficient strength is radiated from the main surface toward the sub liquid crystal display panel PNL2. Accordingly, the sub liquid crystal display panel PNL2 of the foldable mobile phone on which the liquid crystal display device of this embodiment is mounted can receive sufficient radiation of light in a state in which the foldable mobile phone is folded, as well as in a state in which the foldable mobile phone is opened, whereby the images generated on the mobile phone can be recognized by a user of the foldable mobile phone with the naked eye.

However, the sub liquid crystal display panel PNL2 mounted on the foldable mobile phone is smaller than the main liquid crystal display panel PNL1. Accordingly, in the casing CAS, a recessed portion for housing the sub liquid crystal display panel PNL2 and an opening OPN portion to allow the irradiation of the light radiated from the second main surface of the light guide plate GLB to the main surface of the sub liquid crystal display panel PNL2 are provided. The first main surface of the light guide plate GLB has a portion which faces the second main surface, which faces the sub liquid crystal display panel PNL2 in an opposed manner, and, at the same time, the main liquid crystal display panel PNL1 provides an image to the user in a state in which the foldable mobile phone is opened; and, hence, brightness irregularities arise on the image displayed on the main liquid crystal display panel PNL1.

A cause of the generation of the brightness irregularities will be considered as follows. As described above, on the second main surface of the light guide plate GLB, a portion of the casing CAS and the sub liquid crystal display panel PNL2 face each other; and, hence, the light radiated from the second main surface of the light guide plate GLB is strongly reflected on the casing CAS portion having the high reflectance and is returned to the first main surface of the light guide plate GLB. However, since the sub liquid crystal display panel PNL2 portion exhibits a low reflectance, the light which is returned to the first main surface of the light guide plate GLB is weak. Accordingly, the light radiated from the first main surface of the light guide pate GLB has strong and weak portions. The image displayed on the main liquid crystal display panel PNL1 exhibits the strong and weak portions of the light irradiated from the first main surface of the light guide plate GLB as part of the image, with the result that brightness irregularities are generated.

For example, on the screen (substantially corresponding to the main surface of the substrate SUB2$m$) of the main liquid crystal display panel PNL1 shown in FIG. 1A, the brightness of the display image within a broken frame, designated as the sub panel lighting area, becomes smaller than the brightness of a region which surrounds the sub panel lighting area.

This sub panel lighting area is, as shown in FIG. 1B, defined by projecting a region (the above-mentioned "one portion") of the second main surface of the light guide plate GLB which faces the sub liquid crystal display panel PNL2 in an opposed manner to the first main surface of the light guide plate GLB. Further, in mounting the main liquid crystal display panel PNL1 on one surface (Side A) of the casing CAS having the opening OPN, as shown in FIG. 1B, and the sub liquid crystal display panel PNL2, which constitutes a second main surface on another surface (Side B) of the casing CAS, respectively, it is also possible to define the sub panel lighting area by projecting the "one portion" of the second main surface of the light guide plate GLB which faces the opening OPN to the first main surface of the light guide plate GLB.

Assuming a case in which the casing CAS is formed of a material having the high optical transmissivity so as to narrow the difference in brightness between the sub panel lighting area on the screen (substrate SUB2$m$) of the main liquid crystal display panel PNL1 and another region, so long as the housing (at least the image display part) of the foldable mobile phone into which the liquid crystal display device is incorporated is formed of a material which hardly allows light transmission therethrough, it is impossible to eliminate the above-mentioned brightness irregularities.

Figure 2:
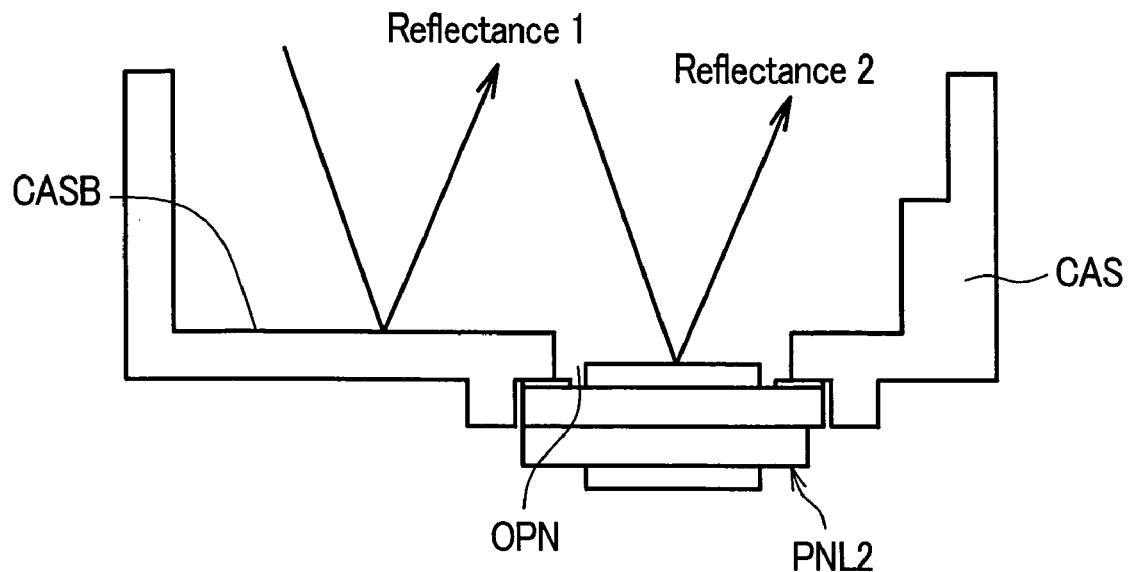
FIG. 2 is a cross-sectional view showing one embodiment of a casing preferable for use in the liquid crystal display device shown in FIG. 1A.

Under such circumstances, the invention provides the casing CAS shown in FIG. 2 to the liquid crystal display device (both-side liquid crystal display device) shown in FIG. 1A. FIG. 2 is a cross-sectional view showing one embodiment of the casing CAS according to the invention. As shown in FIG. 1B, on a first bottom surface CASB of a holding portion formed in a first recessed portion of the casing CAS, an optical sheet OPSs is arranged to bridge over the above-mentioned opening OPN. A suitable amount of color pigment is added to the casing CAS so as to lower the reflectance wavelength characteristic of a surface portion thereof.

As the casing CAS, a mold casing which is formed by molding polycarbonate resin material is used, for example. The mold casing is formed by molding the polycarbonate resin material to which a proper amount of color pigment is added.

Figure 3:
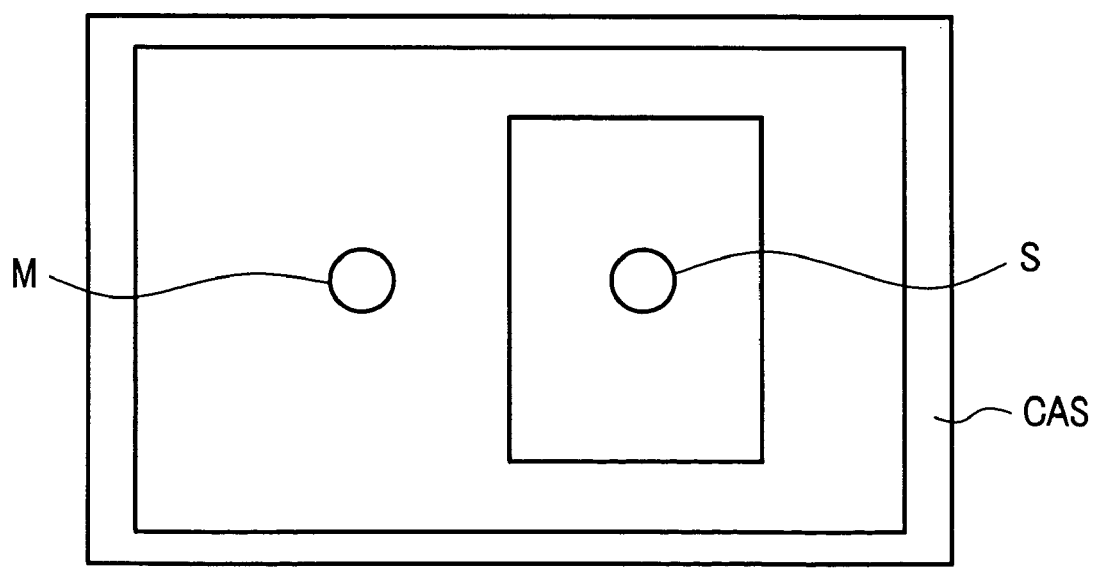
FIG. 3 is a plan view showing reflectance measuring points on a surface of a first recessed portion of a casing and a display surface of the sub liquid crystal display panel shown in FIG. 2.

FIG. 3 is a plan view showing the measurement of respective reflectance wavelength characteristics of the mold portion of the casing CAS and the panel PNL2 portion of the sub liquid crystal display panel PNL2 arranged at the opening OPN in FIG. 2. In FIG. 3, a point M indicates a reflectance measuring point in the mold portion which constitutes the holding portion and a point S indicates a reflectance measuring point in the sub liquid crystal display panel PNL2 portion. The measurement of the reflectance wavelength characteristics is performed using a spectrophotometric apparatus at the measuring point M and the measuring point S so as to measure the reflectance 1 and the reflectance 2, respectively, based on the irradiation light and the reflection light thereof, as shown in FIG. 2.

Figure 4:
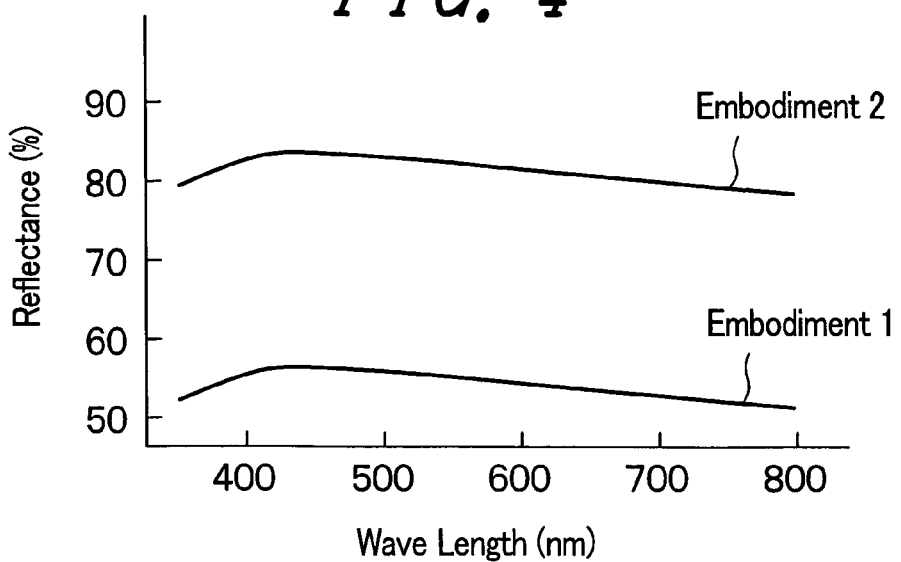
FIG. 4 is a graph showing the reflectance wavelength characteristics of one embodiment and another embodiment of the liquid crystal display device according to the invention.

FIG. 4 is a graph showing the reflectance wavelength characteristics (reflectance 2) of a portion of the sub liquid crystal display panel PNL2 of the embodiment 1 and the reflectance wavelength characteristics (reflectance 4) of an optical panel portion arranged above the sub liquid crystal display panel PNL2 of an embodiment 2 to be explained later.

In this embodiment, the casing CAS is formed by molding such that the above-mentioned added amount of color pigment is suitably adjusted to set the reflectance wavelength characteristics of the mold portion M shown in FIG. 3 so as to be substantially equal to the reflectance wavelength characteristics of the portion of the sub liquid crystal display panel PNL2. Here, although it is preferable to use gray as the color of the color pigment, the color is not specifically limited and any single color or any mixed color can be used.

In accordance with the invention, to exhibit substantially equal reflectance wavelength characteristics implies that the reflectance wavelength characteristics of the mold portion M is set such that the reflectance wavelength characteristics fall within a range of ±5% of the reflectance wavelength characteristics of the embodiment 1, as shown in FIG. 4. Accordingly, when the reflectance wavelength characteristics at the reflectance measuring point S in the sub liquid crystal display panel PNL2 and the reflectance wavelength characteristics at the reflectance measuring point M in the mold portion which constitutes the holding portion fall within the range of ±5%, such reflectance wavelength characteristics are included in the invention.

Figure 5A:
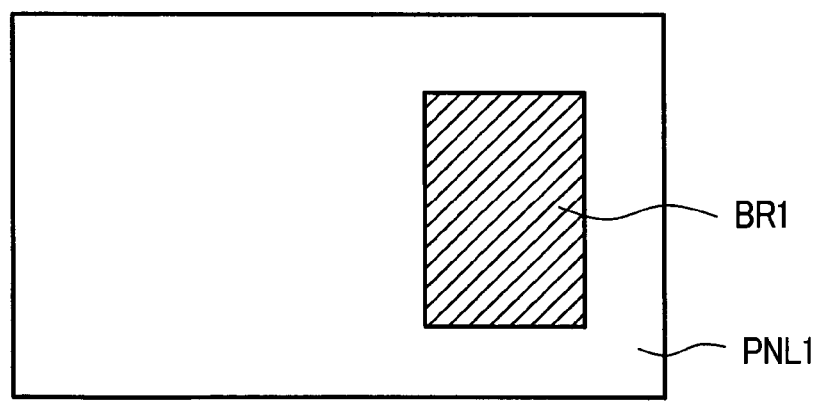
FIGS. 5A and 5B are diagrams showing a state in which brightness irregularities which appear on the main liquid crystal display panel of the liquid crystal display device according to the invention are suppressed.
Figure 5B:
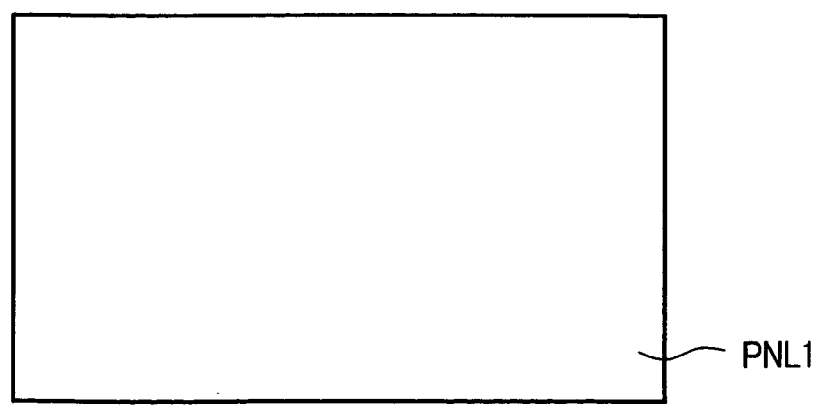

Accordingly, the reflectance wavelength characteristics of the sub liquid crystal display panel PNL2 and the reflectance wavelength characteristics of the mold portion of the casing CAS become substantially equal, and, hence, they become uniform. Accordingly, the generation of the brightness irregularities BRI, as shown in FIG. 5A, which are attributed to the difference in the reflectance wavelength characteristics displayed on the screen of the main liquid crystal display panel PNL1, is eliminated, as shown in FIG. 5B, and the brightness irregularities on the screen of the main liquid crystal display panel PNL1 become hardly recognized by a user of a mobile phone on which the liquid crystal display device of the invention is mounted with his/her. Further, due to such a constitution, it is possible to display images with a uniform brightness over the whole region of the screen.

[Embodiment 2]

Figure 6:
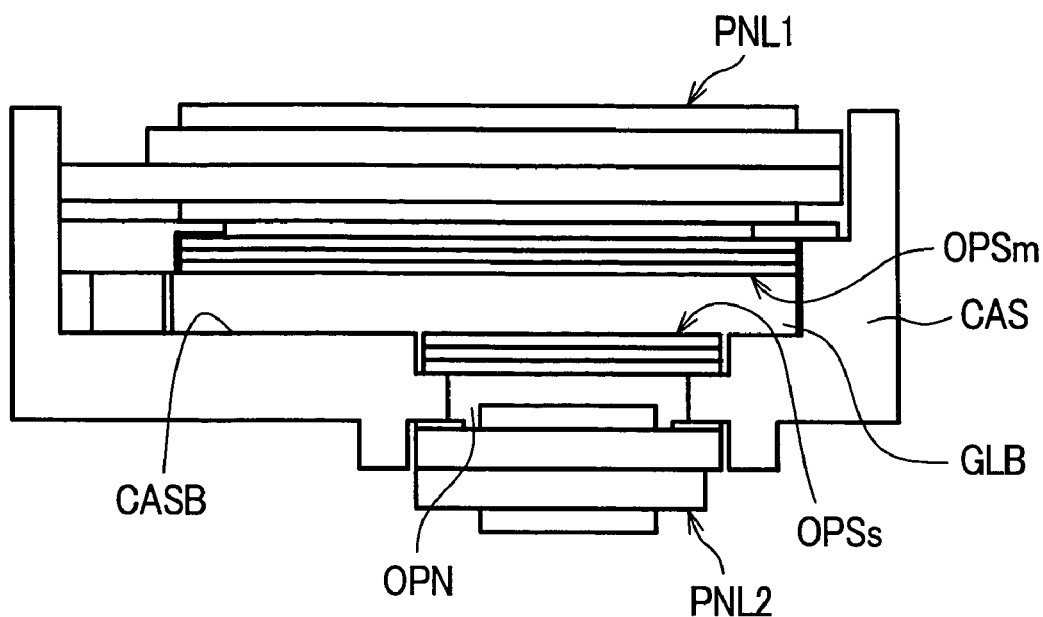
FIG. 6 is a cross-sectional view showing the constitution according to another embodiment of a casing preferable for use in the liquid crystal display device according to the invention.

FIG. 6 is a cross-sectional view showing another embodiment of a casing CAS of the liquid crystal display device (both-side liquid crystal display device) according to the invention. In FIG. 6, a point which makes this embodiment different from the embodiment shown in FIG. 1B lies in the fact that the size of the optical sheet OPSs is made small with a view toward reduction of the cost of the members. On a first bottom surface CASB formed in a first recessed portion of the casing CAS, the above-mentioned optical sheet OPSs is arranged over the opening OPN. Further, the casing CAS is formed such that the light reflection characteristics are enhanced by whitening a surface of the casing CAS by suitably adding a given amount of titanium oxide to the casing CAS.

As the casing CAS, a mold casing which is formed by molding polycarbonate resin material is used. The surface of the mold casing is whitened by forming the casing using polycarbonate resin material to which a given amount of titanium oxide and color pigment is added.

Figure 7:
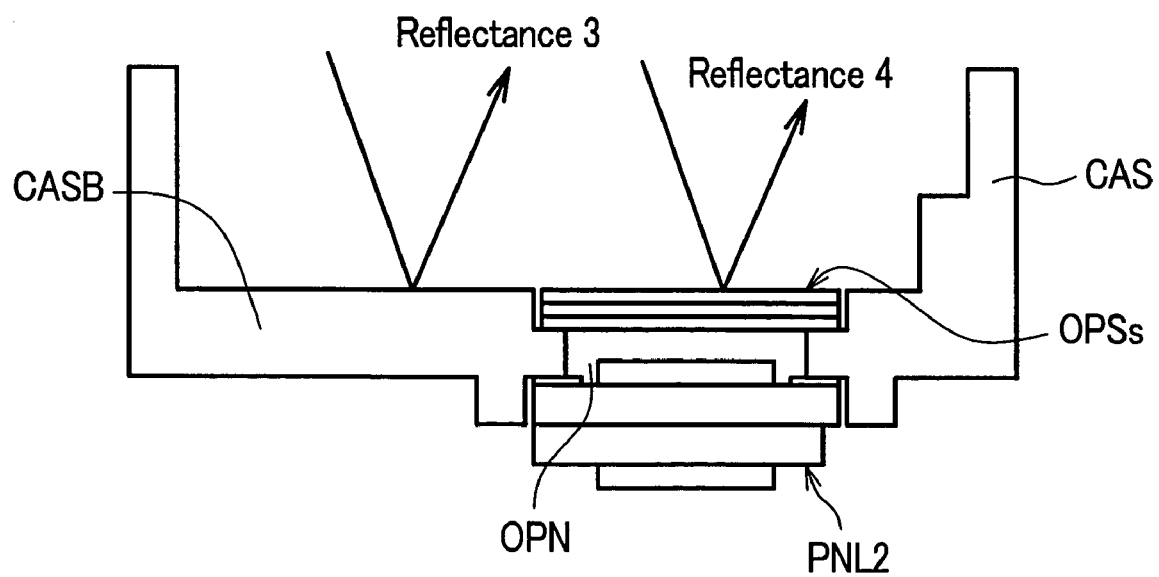
FIG. 7 is a cross-sectional view showing reflectance measuring points on a surface of a first recessed portion of a casing and a display surface of the sub liquid crystal display panel shown in FIG. 6.

FIG. 7 is a cross-sectional view corresponding to FIG. 6 for explaining the measurement of respective reflectance wavelength characteristics of the surface of the bottom surface CASB of the first recessed portion formed in the casing CAS and the surface of the sub liquid crystal display panel PNL2. In FIG. 7, the reflectance wavelength characteristics of a measuring point M and a measuring point S corresponding to FIG. 3 are measured using means similar to the above-mentioned measuring means. That is, the reflectance 3 and the reflectance 4 of the measuring point M and the measuring point S are measured based on the irradiation light and the reflection light shown in FIG. 7. The point which makes this embodiment different from embodiment 1 lies in the fact that, while the reflectance wavelength characteristics are measured in a state in which the optical sheet is removed, as shown in FIG. 2, in the embodiment 1, the reflectance wavelength characteristics are measured in a state in which the optical sheet is arranged on the sub liquid crystal display panel PNL2, as shown in FIG. 7, in this embodiment. In this case, since the reflectance wavelength characteristics are measured from above the optical sheet, the reflectance wavelength characteristics described in conjunction with the embodiment 2, as shown in FIG. 4, is obtained.

Also, in this embodiment 2, the casing CAS is formed by molding, such that the above-mentioned added amount of color pigment is suitably adjusted to set the reflectance wavelength characteristics of the reflectance measuring point M in the mold portion of the holding portion so as to become substantially equal to the reflectance wavelength characteristics of the reflectance measuring point S in the portion of the sub liquid crystal display panel PNL2. In this embodiment, for example, the mold portion of the holding portion is whitened by suitably adjusting the added amount of titanium oxide and color pigment in the plastic resin.

Also, in this embodiment 2, to exhibit substantially equal reflectance wavelength characteristics implies that the reflectance wavelength characteristics of the mold portion M is set such that the reflectance wavelength characteristics fall within a range of ±5% of the reflectance wavelength characteristics of the embodiment 2 shown in FIG. 4. Accordingly, when the reflectance wavelength characteristics of the optical sheet at the reflectance measuring point S above the sub liquid crystal display panel PNL2 and the reflectance wavelength characteristics at the reflectance measuring point M in the mold portion, which constitutes the holding portion, fall within the range of ±5%, such reflectance wavelength characteristics are included in the invention.

Accordingly, the reflectance wavelength characteristics of the surface of the optical sheet above the sub liquid crystal display panel PNL2 and the reflectance wavelength characteristics of the bottom portion CASB of the first recessed portion formed in the casing CAS become substantially equal; and, hence, they become uniform. Accordingly, the generation of the brightness irregularities BRI shown in FIG. 5A, which are attributed to a difference in the reflectance wavelength characteristics displayed on the screen of the main liquid crystal display panel PNL1, is eliminated, as shown in FIG. 5B, and the brightness irregularities on the screen of the main liquid crystal display panel PNL1 are hardly recognized by a user of a mobile phone on which the liquid crystal display device of the invention is mounted. Further, due to such a constitution, it is possible to display bright and beautiful images with uniform brightness over the whole region of the screen.

Here, in the above-mentioned respective embodiments, explanation has been made with respect to case in which the reflectance wavelength characteristics are adjusted by adding a color pigment or titanium oxide to the casing CAS. However, the invention is not limited to such a case, and it is possible to obtain advantageous effects similar to the above-mentioned advantageous effects by forming the mold case by molding, partially using polycarbonate resin material, such that the polycarbonate resin material in which a color pigment or the titanium oxide is added is used in a portion of the holding portion of the mold frame which forms the casing.

According to the invention, in a liquid crystal display device (both-side liquid crystal display device) in which the main liquid crystal display panel and the sub liquid crystal display panel are mounted such that the main liquid crystal display panel is irradiated by one of the main surfaces of the light guide plate provided with a light source at one end thereof and the sub liquid crystal display panel, which has a smaller screen than the main liquid crystal display panel, is irradiated by another main surface of the light guide plate, it is possible to obtain equal reflectance wavelength characteristics at the holding portion and the sub liquid crystal display panel surface. Accordingly, it is possible to suppress the generation of brightness irregularities on the screen of the main liquid crystal display panel, whereby the image quality of the screen of the main liquid crystal display panel can be enhanced. Further, in the foldable mobile phone or personal digital assistant on which the liquid crystal display device is mounted, it is possible to enhance the visibility of the image (information) displayed on the main screen.

What is claimed is:

1. A liquid crystal display device comprising:
a light source;
a light guide body which guides light from the light source;
a main liquid crystal display panel which is arranged on one surface side of the light guide body; and
a sub liquid crystal display panel which is arranged on another surface side of the light guide body and is smaller than the main liquid crystal display panel, wherein
the liquid crystal display device includes a holding portion which has a first side which holds the main liquid crystal display panel and the light guide body and a second side which holds the sub liquid crystal display panel,
the holding portion has an opening portion between the light guide plate arranged on the first side and the sub liquid crystal display panel arranged on the second side, and
the reflectance wavelength characteristic of a bottom surface of the first side of the holding portion is substantially equal to the reflectance wavelength characteristic of the sub liquid crystal display panel.

2. A liquid crystal display device according to claim 1, wherein a bottom surface of the holding portion on the first side is formed by plastic resin containing titanium oxide and a gray color pigment.

3. A liquid crystal display device according to claim 1, wherein the whole holding portion is formed of a member having a reflectance wavelength characteristic substantially equal to the reflectance wavelength characteristic of the sub liquid crystal display panel.

4. A liquid crystal display device according to claim 2, wherein the whole holding portion is formed of a member having the reflectance wavelength characteristic substantially equal to a reflectance wavelength characteristic of the sub liquid crystal display panel.

5. A liquid crystal display device according to claim 1, wherein the holding portion has an optical sheet arranged between a bottom surface on the first side and the light guide body.

6. A liquid crystal display device comprising:
a light source;
a light guide body which guides light from the light source;
a main liquid crystal display panel which is arranged on one surface side of the light guide body; and
a sub liquid crystal display panel which is arranged on another surface side of the light guide body and is smaller than the main liquid crystal display panel, wherein
the liquid crystal display device includes a holding portion which has a first side which holds the main liquid crystal display panel and the light guide body and a second side which holds the sub liquid crystal display panel,
the holding portion has an opening portion between the light guide plate arranged on the first side and the sub liquid crystal display panel arranged on the second side,
an optical sheet is arranged on the first side of the holding portion corresponding to a position where the sub liquid crystal display panel is arranged, and
the reflectance wavelength characteristic of a bottom surface of the first side of the holding portion is substantially equal to the reflectance wavelength characteristic of the optical sheet which is arranged corresponding to the sub liquid crystal display panel.

7. A liquid crystal display device according to claim 6, wherein a bottom surface of the holding portion on the first side is formed by plastic resin containing titanium oxide and a gray color pigment.

8. A liquid crystal display device according to claim 6, wherein the whole holding portion is formed of a member having a reflectance wavelength characteristic substantially equal to the reflectance wavelength characteristic of the sub liquid crystal display panel.

9. A liquid crystal display device according to claim 7, wherein the whole holding portion is formed of a member having a reflectance wavelength characteristic substantially equal to the reflectance wavelength characteristic of the sub liquid crystal display panel.

10. A liquid crystal display device comprising:
a casing having a first recessed portion which opens on one side and a second recessed portion which opens on another side opposite to said one side, wherein the second recessed portion has a bottom surface thereof opened on the first recessed portion side,
a main liquid crystal display panel which is housed in the first recessed portion of the casing; and
a sub liquid crystal display panel which is housed in the second recessed portion of the casing, wherein
the reflectance wavelength characteristic of the bottom surface of the first recessed portion is substantially equal to the reflectance wavelength characteristic of the sub liquid crystal display panel as measured from the first recessed portion side.

11. A liquid crystal display device according to claim 10, wherein a light source and a light guide body are arranged between the first recessed portion of the casing and the main liquid crystal display panel.

12. A liquid crystal display device according to claim 11, wherein an optical sheet is arranged between the first recessed portion of the casing and the light guide plate.

13. A liquid crystal display device according to claim 10, wherein a bottom surface of the first recessed portion of the casing is formed by plastic resin containing titanium oxide and a gray color pigment.

14. A liquid crystal display device according to claim 13, wherein the whole casing is formed by plastic resin containing titanium oxide and a gray color pigment.

15. A liquid crystal display device according to claim 10, wherein the whole casing is formed of a member having a reflectance wavelength characteristic substantially equal to the reflectance wavelength characteristic of the sub liquid crystal display panel.

* * * * *